US012473357B2

(12) United States Patent
Tsicopoulos et al.

(10) Patent No.: US 12,473,357 B2
(45) Date of Patent: Nov. 18, 2025

(54) USE OF ANTAGONISTS OF Th17 CYTOKINES FOR THE TREATMENT OF BRONCHIAL REMODELING IN PATIENTS SUFFERING FROM ALLERGIC ASTHMA

(71) Applicants: INSERM (INSTITUT NATIONAL DE LA SANTÉ ET DE LA RECHERCHE MÉDICALE), Paris (FR); UNIVERSITÉ DE LILLE, Lille (FR); CENTRE NATIONAL DE LA RECHERCHE SCIENTIFIQUE (CNRS), Paris (FR); INSTITUT PASTEUR DE LILLE, Lille (FR); CENTRE HOSPITALIER REGIONAL UNIVERSITARIE DE LILLE

(72) Inventors: Anne Tsicopoulos, Lille (FR); Saliha Ait Yahia Sended, Lille (FR); Julie Nanou, Lille (FR); Mélodie Boute, Lille (FR); Han Vorng, Lille (FR); Cécile Chenivesse, Lille (FR)

(73) Assignees: INSERM (INSTITUT NATIONAL DE LA SANTÉ ET DE LA RECHERCHE MÉDICALE), Paris (FR); UNIVERSITÉ DE LILLE, Lille (FR); CENTRE NATIONAL DE LA RECHERCHE SCIENTIFIQUE, Paris (FR); INSTITUT PASTEUR DE LILLE, Lille (FR); CENTRE HOSPITALIER REGIONAL UNIVERSITARIE DE LILLE, Lille (FR)

( * ) Notice: Subject to any disclaimer, the term of this patent is extended or adjusted under 35 U.S.C. 154(b) by 1226 days.

(21) Appl. No.: 17/276,882

(22) PCT Filed: Sep. 24, 2019

(86) PCT No.: PCT/EP2019/075654
§ 371 (c)(1),
(2) Date: Mar. 17, 2021

(87) PCT Pub. No.: WO2020/064702
PCT Pub. Date: Apr. 2, 2020

(65) Prior Publication Data
US 2022/0033486 A1 Feb. 3, 2022

(30) Foreign Application Priority Data
Sep. 25, 2018 (EP) .................................. 18306243

(51) Int. Cl.
*C07K 16/24* (2006.01)
*A61K 38/17* (2006.01)
*A61P 11/06* (2006.01)
*C07K 16/28* (2006.01)

(52) U.S. Cl.
CPC ........ *C07K 16/244* (2013.01); *A61K 38/1793* (2013.01); *A61P 11/06* (2018.01); *C07K 16/2866* (2013.01)

(58) Field of Classification Search
CPC .............. C07K 16/244; C07K 16/2866; C07K 2317/76; A61P 11/06; G01N 2800/122
See application file for complete search history.

(56) References Cited

U.S. PATENT DOCUMENTS 7,432,237 B2 * 10/2008 Yao ..................... C07K 14/7155
435/69.7
2009/0202475 A1 * 8/2009 Abbas ....................... A61P 1/00
435/375

OTHER PUBLICATIONS

Kardas et al., Frontiers in Immunology, 13: 983852, pp. 1-15. (Year: 2022).*
Lilly et al., J Immunol, 189(7): 3653-3660, pp. 1-18. (Year: 2012).*
Godwin et al., J of Immunol, 198(1), Supp 1, abstract No. 53.4. (Year: 2017).*
Vakharia et al., BioDrugs, 31:409-422. (Year: 2017).*
Kim et al., Severe Asthma Phenotypes Classified by Site of Airway Involvement and Remodeling via Chest CT Scan, J Investig Allergol Clin Immunol, 28(5):312-320, Epub Apr. 18, 2018. (Year: 2018).*
Pandey et al., The Impact of Aspergillus fumigatus Viability and Sensitization to Its Allergens on the Murine Allergic Asthma Phenotype, BioMed Res Int., Article ID 619614, 17 pages. (Year: 2013).*
Chang et al., Th17-associated cytokines promote human airway smooth muscle cell proliferation, FASEB J, 26:5152-5160. (Year: 2012).*
Barnes: Targeting cytokines to treat asthma and chronic obstructive pulmonary disease, Nature Reviews Immunology, vol. 18, No. 7, pp. 454-466, Sep. 6, 2018.

(Continued)

*Primary Examiner* — Hong Sang
(74) *Attorney, Agent, or Firm* — WCF IP

(57) ABSTRACT

Bronchial remodelling is a prominent feature of severe asthma and a potential therapeutic target. Some data indicate that Th17 cytokines in particular IL-22 may be involved in remodelling processes in vitro, and in skin remodelling in vivo. The aim of the inventors was to evaluate if Th17 cytokines are involved in bronchial remodelling in a severe model of allergic asthma, and if this was amplified by co-sensitization with NOD2 agonist, MDP, a ligand favouring Th17 polarization. Dog allergen challenge led to a predominant neutrophilic infiltration in Broncho-alveolar lavage (BAL), increased dog-specific IgE production, airways hyperresponsiveness, and increased Th17 cytokine production. Increased bronchial remodeling was observed in dog allergen challenged mice compared to control. IL-22 deficiency decreased airway hyperresponsiveness, bronchial mucus production as well as peribronchial collagen deposition, in the allergen-challenged group. Th17 cytokines in particular IL-22 participate in the bronchial remodeling in a chronic model of neutrophilic asthma, and may represent a therapeutic target in severe asthma.

Figures 1A, 1B:
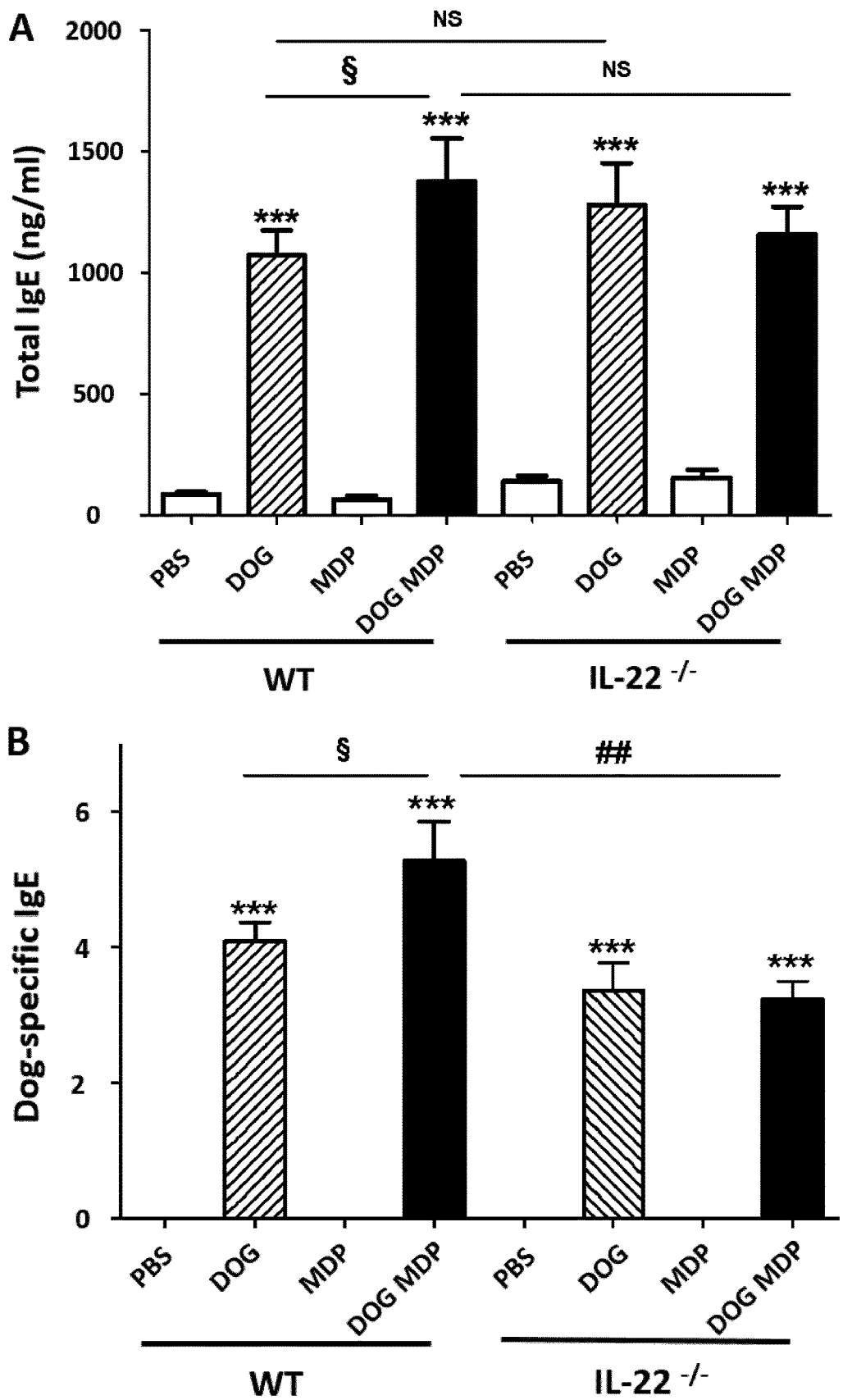

4 Claims, 5 Drawing Sheets
Specification includes a Sequence Listing.

(56) References Cited

OTHER PUBLICATIONS

Besnard et al: "Dual Role of IL-22 in Allergic Airway Inflammation and its Cross-talk with IL-17A", American Journal of Respiratory and Critical Care Medicine, vol. 183, No. 9, pp. 1153-1163, May 1, 2011.

Dudakev Et A: "Interleukin-22: Immunobiology and Pathology", Annual Review of Immunology, vol. 33, No. 1, pp. 747-785, Mar. 21, 2015.

Heck et al: "Pharmacological Therapy of Bronchial Asthma: The Role of Biologicals", Internaitonal Archives of Allergy and Immunology, vol. 168, No. 4, pp. 241-252, Jan. 1, 2015.

Hern-Tze et al: "Novel Biologicals for the Treatment of Allergic Diseases and Asthma", Current Allergy and Asthma Reports, vol. 16, No. 10, pp. 1-14, Sep. 9, 2016.

Hirose et al: "Roles of IL-22 in allergic airway inflammation in mice and humans", International Immunology, vol. 30, No. 9, pp. 413-418, Jan. 31, 2018.

Leyva-Castillo et al: "IL-11 promotes allergic airway inflammation in epicutaneously sensitized mice", Journal of Allergy and Clinical Immunology, vol. 143, No. 2, pp. 619-630, Jun. 18, 2018.

Manni et al: "The enigmatic role of IL-22 in asthma", Expert Review of Respiratory Medicine, vol. 10, No. 6, pp. 619-623, Apr. 18, 2016.

Saglani et al: "Novel concepts in airway inflammation and remodelling in asthma", European Respiratory Journal, vol. 46, No. 6, pp. 1796-1804, Nov. 5, 2015.

Secher et al: "Therapeutic antibodies: A new era in the treatment of respiratory diseases?", Pharmacology & Therapeutics, vol. 189, pp. 149-172, May 4, 2018.

Shilovskiy et al: "Anticytokine therapy of allergic asthma", Molecular Biology: Cover-To-Cover Translation = Molekulyarnaya Biologiya, Academy of Sciences of the USSR, vol. 51, No. 1, pp. 1-13, Feb. 23, 2017.

\* cited by examiner

SEQUENCE LISTING

```
<160> NUMBER OF SEQ ID NOS: 2

<210> SEQ ID NO 1
<211> LENGTH: 155
<212> TYPE: PRT
<213> ORGANISM: Homo sapiens

<400> SEQUENCE: 1

Met Thr Pro Gly Lys Thr Ser Leu Val Ser Leu Leu Leu Leu Leu Ser
1               5                   10                  15

Leu Glu Ala Ile Val Lys Ala Gly Ile Thr Ile Pro Arg Asn Pro Gly
                20                  25                  30

Cys Pro Asn Ser Glu Asp Lys Asn Phe Pro Arg Thr Val Met Val Asn
            35                  40                  45

Leu Asn Ile His Asn Arg Asn Thr Asn Thr Asn Pro Lys Arg Ser Ser
        50                  55                  60

Asp Tyr Tyr Asn Arg Ser Thr Ser Pro Trp Asn Leu His Arg Asn Glu
65                  70                  75                  80

Asp Pro Glu Arg Tyr Pro Ser Val Ile Trp Glu Ala Lys Cys Arg His
                85                  90                  95

Leu Gly Cys Ile Asn Ala Asp Gly Asn Val Asp Tyr His Met Asn Ser
            100                 105                 110

Val Pro Ile Gln Gln Glu Ile Leu Val Leu Arg Arg Glu Pro Pro His
        115                 120                 125

Cys Pro Asn Ser Phe Arg Leu Glu Lys Ile Leu Val Ser Val Gly Cys
    130                 135                 140

Thr Cys Val Thr Pro Ile Val His His Val Ala
145                 150                 155
```

```
<210> SEQ ID NO 2
<211> LENGTH: 179
<212> TYPE: PRT
<213> ORGANISM: Homo sapiens

<400> SEQUENCE: 2

Met Ala Ala Leu Gln Lys Ser Val Ser Ser Phe Leu Met Gly Thr Leu
1               5                   10                  15

Ala Thr Ser Cys Leu Leu Leu Ala Leu Leu Val Gln Gly Gly Ala
            20                  25                  30

Ala Ala Pro Ile Ser Ser His Cys Arg Leu Asp Lys Ser Asn Phe Gln
            35                  40                  45

Gln Pro Tyr Ile Thr Asn Arg Thr Phe Met Leu Ala Lys Glu Ala Ser
        50                  55                  60

Leu Ala Asp Asn Asn Thr Asp Val Arg Leu Ile Gly Glu Lys Leu Phe
65                  70                  75                  80

His Gly Val Ser Met Ser Glu Arg Cys Tyr Leu Met Lys Gln Val Leu
                85                  90                  95

Asn Phe Thr Leu Glu Glu Val Leu Phe Pro Gln Ser Asp Arg Phe Gln
            100                 105                 110

Pro Tyr Met Gln Glu Val Val Pro Phe Leu Ala Arg Leu Ser Asn Arg
            115                 120                 125

Leu Ser Thr Cys His Ile Glu Gly Asp Asp Leu His Ile Gln Arg Asn
            130                 135                 140

Val Gln Lys Leu Lys Asp Thr Val Lys Lys Leu Gly Glu Ser Gly Glu
145                 150                 155                 160

Ile Lys Ala Ile Gly Glu Leu Asp Leu Leu Phe Met Ser Leu Arg Asn
                165                 170                 175

Ala Cys Ile
```

USE OF ANTAGONISTS OF Th17 CYTOKINES FOR THE TREATMENT OF BRONCHIAL REMODELING IN PATIENTS SUFFERING FROM ALLERGIC ASTHMA

SEQUENCE LISTING

This document incorporates by reference an electronic sequence listing text file, which was electronically submitted along with this document. The text file is named 2021-03-17_11450670US_SequenceListing.txt, is 3274 bytes, and was created on Sep. 24, 2018.

FIELD OF THE INVENTION

The present invention relates to use of antagonists of Th17 cytokines for the treatment of bronchial remodeling in patients suffering from allergic asthma.

BACKGROUND OF THE INVENTION

Asthma is a highly prevalent disease with increasing socioeconomic burden, whose most frequent allergic cause is sensitization to house dust mite (HDM). Asthma leads to significant morbidity and mortality with estimated healthcare and lost opportunity costs. Exposure of the respiratory epithelium to allergens such as HDM is the initiating event in allergic asthma, which is characterized by excessive pulmonary inflammation, airway hyperreactivity, and mucus production. Improved therapies are necessary to reduce suffering and lost productivity in asthma patients. Hypertrophy, hyperreactivity, pathological remodeling, airway obstruction and inflammation are well established smooth muscle phenotypes in asthma patients. Therapies have focused on 'upstream' targets, such as G-protein-coupled receptors (e.g., histamine, adrenergic leukotriene), glucocorticoid receptors and reactive oxygen species that activate signaling pathways important for selective smooth muscle responses in asthma. However, these therapies have not reversed the increase in asthma-related morbidity or mortality. Accordingly there is a need for new innovative therapies of asthma.

Bronchial remodeling is generally quite broadly defined as any change in composition, distribution, thickness, mass or volume and/or number of structural components observed in the airway wall of patients relative to healthy individuals. Bronchial remodeling is the physiological acute and transient response to injury and inflammation, which ultimately results in restoration of a normal airway structures. However, bronchial remodeling can become pathological leading to persistently altered airway wall structures and function. Bronchial remodeling is more pronounced in severe asthma and there is a need for efficient therapies. Early treatment of bronchial remodeling has indeed the potential to decrease disease severity.

Th17 cells are characterized by the secretion of IL-17 and IL-22. By releasing several proinflammatory cytokines, they can amplify inflammatory responses through release. The percentage of Th17 cells in PBMCs and IL-17 levels in plasma concentrations correlate with disease severity (Al-Ramli W, Préfontaine D, Chouiali F, et al. *T(H)17-associated cytokines (IL-17A and IL-17F) in severe asthma. J Allergy Clin Immunol.* 2009; 123:1185-7). In humans, increase in IL-22 has been associated with more severe asthma [Farfariello V, Amantini C, Nabissi M, Morelli M B, Aperio C, Caprodossi S, et al. IL-22 mRNA in peripheral blood mononuclear cells from allergic rhinitic and asthmatic pediatric patients. *Pediatr Allergy Immunol.* 2011; 22:419-423.], and IL-22 enhances human airway smooth muscle cell hyperplasia [Chang Y, Al-Alwan L, Risse P A, Halayko A J, Martin J G, Baglole C J, et al. Th17-associated cytokines promote human airway smooth muscle cell proliferation. FASEB J. 2012; 26:5152-5160; Chang Y, Al-Alwan L, Risse P A, Roussel L, Rousseau S, Halayko A J, et al. TH17 cytokines induce human airway smooth muscle cell migration. J Allergy Clin Immunol. 2011; 127:1046-1053], epithelial-mesenchymal transition in asthmatic bronchial epithelial cells [Johnson J R, Nishioka M, Chakir J, Risse P A, Almaghlouth I, Bazarbashi A N, et al. IL-22 contributes to TGF-beta1-mediated epithelial-mesenchymal transition in asthmatic bronchial epithelial cells. *Respir Res.* 2013; 14:118.], as well as cutaneous remodeling [Eyerich S, Eyerich K, Pennino D, Carbone T, Nasorri F, Pallotta S, et al. Th22 cells represent a distinct human T cell subset involved in epidermal immunity and remodeling. *J Clin Invest.* 2009; 119:3573-3585]. Whether Th17 cells directly contribute to bronchial remodeling is part of an ongoing discussion. In a mouse model of chronic experimental asthma, the absence of Th17 cells resulted in diminished bronchial remodeling as demonstrated by reduced staining of collagen fibers and α-smooth muscle actin, although allergic airway inflammation remained unaltered (Zhao J, Lloyd C M, Noble A. *Th17 responses in chronic allergic airway inflammation abrogate regulatory T-cell-mediated tolerance and contribute to bronchial remodeling. Mucosal Immunol.* 2013; 6:335-46.). Lu et al. also used a mouse model of chronic experimental asthma and correlated progressively increasing levels of Th17 cells and IL-17A with peribronchial microvessel density (Lu S, Li H, Gao R, et al. *IL-17A, but not IL-17F, is indispensable for airway vascular remodeling induced by exaggerated Th17 cell responses in prolonged ovalbumin-challenged mice. J Immunol.* 2015; 194:3557-66). Neutralization of IL-17 abrogated these signs of vascular remodeling. However, in both studies, lack or reduction of IL-17 as produced by Th17 cells was paralleled by a reduction of inflammatory cell infiltration, neutrophils in the study of Zhao et al. or eosinophils in the study of Lu et al. so that it is still not clear whether they indeed have a direct effect on bronchial remodeling or whether they contribute to this by enhancing the local inflammatory response.

SUMMARY OF THE INVENTION

The present invention relates to use of antagonists of Th17 cytokines for the treatment of bronchial remodeling in patients suffering from allergic asthma. In particular, the present invention is defined by the claims.

DETAILED DESCRIPTION OF THE INVENTION

The first object of the present invention relates to a method of treating bronchial remodeling in a patient suffering from allergic asthma comprising administering to the patient a therapeutically effective amount of antagonist of Th17 cytokines.

As used herein, the term "asthma" has its general meaning in the art and refers to a chronic disorder characterized by airway inflammation, increased mucus secretion, and bronchial hyperresponsiveness, all of which cause reversible airflow obstruction. The chronic inflammation, disrupted epithelium, and bronchial remodeling increase the susceptibility to many environmental factors, such as viral infections and allergens. In allergic asthma the inflammatory disease is mainly driven by exposure to inhalant allergens to which the patient is sensitised. In some embodiments, the patient suffers from severe asthma. As used herein, the term "severe asthma" has its general meaning in the art and refers to asthma which requires treatment with high doses of corticosteroid and $\beta_2$-adrenergic receptor agonist to prevent it from becoming uncontrolled or which remains uncontrolled despite therapy.

As used herein, the term "bronchial remodeling" has its general meaning in the art and refers to the structural changes that occur in both the large and the small airways. In asthma, airway structural changes include subepithelial fibrosis, increased smooth muscle mass, enlargement of glands, neovascularization, and epithelial alterations. These remodeling changes contribute to thickening of airway walls and consequently lead to airway narrowing, bronchial hyperresponsiveness, airway edema, and mucous hypersecretion. Bronchial remodeling is associated with poorer clinical outcome among patients with asthma. In this article, we briefly provide an update on the characteristic features of bronchial remodeling observed in asthma and their clinical consequences.

As used herein, the term "treatment" or "treat" refer to both prophylactic or preventive treatment as well as curative or disease modifying treatment, including treatment of patient at risk of contracting the disease or suspected to have contracted the disease as well as patients who are ill or have been diagnosed as suffering from a disease or medical condition, and includes suppression of clinical relapse. The treatment may be administered to a patient having a medical disorder or who ultimately may acquire the disorder, in order to prevent, cure, delay the onset of, reduce the severity of, or ameliorate one or more symptoms of a disorder or recurring disorder, or in order to prolong the survival of a patient beyond that expected in the absence of such treatment. By "therapeutic regimen" is meant the pattern of treatment of an illness, e.g., the pattern of dosing used during therapy. A therapeutic regimen may include an induction regimen and a maintenance regimen. The phrase "induction regimen" or "induction period" refers to a therapeutic regimen (or the portion of a therapeutic regimen) that is used for the initial treatment of a disease. The general goal of an induction regimen is to provide a high level of drug to a patient during the initial period of a treatment regimen. An induction regimen may employ (in part or in whole) a "loading regimen", which may include administering a greater dose of the drug than a physician would employ during a maintenance regimen, administering a drug more frequently than a physician would administer the drug during a maintenance regimen, or both. The phrase "maintenance regimen" or "maintenance period" refers to a therapeutic regimen (or the portion of a therapeutic regimen) that is used for the maintenance of a patient during treatment of an illness, e.g., to keep the patient in remission for long periods of time (months or years). A maintenance regimen may employ continuous therapy (e.g., administering a drug at a regular intervals, e.g., weekly, monthly, yearly, etc.) or intermittent therapy (e.g., interrupted treatment, intermittent treatment, treatment at relapse, or treatment upon achievement of a particular predetermined criteria [e.g., pain, disease manifestation, etc.]).

In some embodiments, the antagonist of Th17 cytokine is particularly suitable for preventing exacerbation. As used herein, the term "exacerbation" has its general meaning in the art and refers to an acute or subacute episode of progressive worsening of symptoms of asthma, including shortness of breath, wheezing, cough, and chest tightness. Exacerbations are marked by decreases from baseline in objective measures of pulmonary function, such as peak expiratory flow rate and FEV1 (Forced Expiratory Volume). The method of the present invention is thus particularly suitable for reducing the frequency, severity or duration of one or more of said symptoms. In some embodiments, the exacerbation has a viral aetiology. Viral pathogens associated with acute exacerbations in patients with asthma include rhinoviruses (RV), influenza, parainfluenza, coronavirus, adenovirus, and respiratory syncytial virus (RSV). In some embodiments, the exacerbation results from a human rhinovirus (HRV) infection. HRVs are nonenveloped positive-strand RNA viruses in the family Picornaviridae and genus Enterovirus and are classified into 3 species (HRV-A, HRV-B and HRV-C). There are more than 160 distinct HRV genotypes, including 80 HRV-A and 32 HRV-B serotypes and 65 newly identified HRV-C serotypes.

As used herein, the term "Th17 cytokines" has its general meaning in the art and refers to cytokines that are expressed (intracellularly and/or secreted) by Th17 T cells, including IL-17A, IL-17F, IL-22 and IL-21.

A used herein, the term "IL-17" refers to interleukin 17 more particularly to the IL-17A siform, formerly known as CTLA8. The term includes wild-type IL-17A from various species (e.g., human, mouse, and monkey), polymorphic variants of IL-17A, and functional equivalents of IL-17A. An exemplary amino acid sequence of IL17A is provided by SEQ ID NO:1. IL-17 receptor refers to IL-17 receptor A, IL-17 receptor C. IL-17 receptor B, IL-17 receptor E, homomeric complexes, and heteromeric complexes thereof. Interleukin-17 receptor (IL-17R) is a cytokine receptor which binds interleukin 17A and that is a heteromeric complex consisting of at least IL17RA and IL17RC.

>sp|Q16552| IL17_HUMAN Interleukin-17A OS = Homo sapiens OX = 9606 GN = IL17A PE = 1 SV = 1

SEQ ID NO: 1
MTPGKTSLVSLLLLLSLEAIVKAGITIPRNPGCPNSEDKNFPRTVMVNLN

IHNRNTNTNPKRSSDYYNRSTSPWNLHRNEDPERYPSVIWEAKCRHLGCI

NADGNVDYHMNSVPIQQEILVLRREPPHCPNSFRLEKILVSVGCTCVTPI

VHHVA

A used herein, the term "IL-22" refers to interleukin 22 and includes wild-type IL-22 from various species (e.g., human, mouse, and monkey), polymorphic variants of IL-22, and functional equivalents of IL-22. An exemplary amino acid sequence of IL-22 is provided by SEQ ID NO:2. Interleukin-22 receptor is a type II cytokine receptor which is a heterodimer of IL22RA1 or IL22RA2 with and IL-10RB2 subunits.

>sp|Q9GZX6| IL22_HUMAN Interleukin-22 OS = Homo sapiens OX = 9606 GN = IL22 PE = 1 SV = 1

SEQ ID NO: 2
MAALQKSVSSFLMGTLATSCLLLLALLVQGGAAAPISSHCRLDKSNFQQP

YITNRTFMLAKEASLADNNTDVRLIGEKLFHGVSMSERCYLMKQVLNFTL

EEVLFPQSDRFQPYMQEVVPFLARLSNRLSTCHIEGDDLHIQRNVQKLKD

TVKKLGESGEIKAIGELDLLFMSLRNACI

As used herein, the term "antagonist of Th17 cytokine" refers to a molecule capable of antagonizing (e.g., reducing, inhibiting, decreasing, blocking, delaying) the function of a Th7 cytokine, expression and/or signalling (e.g., by blocking the binding of the cytokine to its receptor). In some embodiments, the antagonist is an antagonist of IL-17. In some embodiments, the antagonist is an antagonist of IL-22. Non-limiting examples of antagonists of IL-17 or IL-22 include IL-17 or IL-22 binding molecules and IL-17 or IL-22 receptor binding molecules. By "IL-17 or IL-22 binding molecule" is meant any molecule capable of binding to the human IL-17 or IL-22 antigen either alone or as it is associated with other molecules. The binding reaction may be shown by standard methods (qualitative assays) including, for example, a binding assay, competition assay or a bioassay for determining the inhibition of IL-17 or IL-22 binding to its receptor or any kind of binding assays, with reference to a negative control test in which an antibody of unrelated specificity but of the same isotype. Non-limiting examples of IL-17 or IL-22 binding molecules include small molecules, IL-17 or IL-22 receptor decoys, and antibodies as produced by B-cells or hybridomas and chimeric, CDR-grafted or human antibodies or any fragment thereof, e.g., F(ab')2 and Fab fragments, as well as single chain or single domain antibodies. Preferably the IL-17 or IL-22 binding molecule antagonizes (e.g., reduces, inhibits, decreases, delays) IL-17 or IL-22 function, expression and/or signalling. In some embodiments of the disclosed methods, regimens, kits, processes, uses and compositions, an IL-17 or IL-22 binding molecule is employed.

Accordingly, in some embodiments, the antagonist is an IL-17 or IL-22 antagonistic antibody. An IL-17 or IL-22 antagonistic antibody refers to an antibody that binds the cytokine or the receptor thereof, and inhibits the activities of said cytokine.

Typically, the IL-17 antagonistic antibody binds IL-17A IL or IL-17 receptor A or IL-17 receptor C. The embodiments of the IL-17 antagonistic antibodies are disclosed, for example, ixekizumab (see U.S. Pat. Nos. 7,838,638 and 8,110,191), secukinumab (see U.S. Pat. No. 7,807,155), and brodalumab (see U.S. Pat. No. 7,767,206).

Typically, the IL-22 antagonistic antibody binds IL-22 or IL22RA1 or IL22RA2. IL-22 antagonistic antibody include the IL-22 specific mAb Fezakinumab (a.k.a. ILV-094 (Pfizer)).

As used herein, the term "antibody" is thus used to refer to any antibody-like molecule that has an antigen binding region, and this term includes antibody fragments that comprise an antigen binding domain such as Fab', Fab, F(ab')2, single domain antibodies (DABs), TandAbs dimer, Fv, scFv (single chain Fv), dsFv, ds-scFv, Fd, linear antibodies, minibodies, diabodies, bispecific antibody fragments, bibody, tribody (scFv-Fab fusions, bispecific or trispecific, respectively); sc-diabody; kappa (lamda) bodies (scFv-CL fusions); BiTE (Bispecific T-cell Engager, scFv-scFv tandems to attract T cells); DVD-Ig (dual variable domain antibody, bispecific format); SIP (small immunoprotein, a kind of minibody); SMIP ("small modular immunopharmaceutical" scFv-Fc dimer; DART (ds-stabilized diabody "Dual Affinity ReTargeting"); small antibody mimetics comprising one or more CDRs and the like. The techniques for preparing and using various antibody-based constructs and fragments are well known in the art (see Kabat et al., 1991, specifically incorporated herein by reference). Diabodies, in particular, are further described in EP 404, 097 and WO 93/1 1 161; whereas linear antibodies are further described in Zapata et al. (1995). Antibodies can be fragmented using conventional techniques. For example, F(ab')2 fragments can be generated by treating the antibody with pepsin. The resulting F(ab')2 fragment can be treated to reduce disulfide bridges to produce Fab' fragments. Papain digestion can lead to the formation of Fab fragments. Fab, Fab' and F(ab')2, scFv, Fv, dsFv, Fd, dAbs, TandAbs, ds-scFv, dimers, minibodies, diabodies, bispecific antibody fragments and other fragments can also be synthesized by recombinant techniques or can be chemically synthesized. Techniques for producing antibody fragments are well known and described in the art. For example, each of Beckman et al., 2006; Holliger & Hudson, 2005; Le Gall et al., 2004; Reff & Heard, 2001; Reiter et al., 1996; and Young et al., 1995 further describe and enable the production of effective antibody fragments. In some embodiments, the antibody of the present invention is a single chain antibody. As used herein the term "single domain antibody" has its general meaning in the art and refers to the single heavy chain variable domain of antibodies of the type that can be found in Camelid mammals which are naturally devoid of light chains. Such single domain antibody are also "Nanobody®". For a general description of (single) domain antibodies, reference is also made to the prior art cited above, as well as to EP 0 368 684, Ward et al. (Nature 1989 Oct. 12; 341 (6242): 544-6), Holt et al., Trends Biotechnol., 2003, 21 (11): 484-490; and WO 06/030220, WO 06/003388.

In some embodiments, the antibody is a humanized antibody. As used herein, "humanized" describes antibodies wherein some, most or all of the amino acids outside the CDR regions are replaced with corresponding amino acids derived from human immunoglobulin molecules. Methods of humanization include, but are not limited to, those described in U.S. Pat. Nos. 4,816,567, 5,225,539, 5,585,089, 5,693,761, 5,693,762 and 5,859,205, which are hereby incorporated by reference.

In some embodiments, the antibody is a fully human antibody. Fully human monoclonal antibodies also can be prepared by immunizing mice transgenic for large portions of human immunoglobulin heavy and light chain loci. See, e.g., U.S. Pat. Nos. 5,591,669, 5,598,369, 5,545,806, 5,545, 807, 6,150,584, and references cited therein, the contents of which are incorporated herein by reference.

In some embodiments, the antibody of the present invention is a single chain antibody. As used herein the term "single domain antibody" has its general meaning in the art and refers to the single heavy chain variable domain of antibodies of the type that can be found in Camelid mammals which are naturally devoid of light chains. Such single domain antibody are also "Nanobody®".

In some embodiments, the antibody comprises human heavy chain constant regions sequences but will not induce antibody dependent cellular cytotoxicity (ADCC). In some embodiments, the antibody of the present invention does not comprise an Fc domain capable of substantially binding to a FcgRIIIA (CD16) polypeptide. In some embodiments, the antibody of the present invention lacks an Fc domain (e.g. lacks a CH2 and/or CH3 domain) or comprises an Fc domain of IgG2 or IgG4 isotype. In some embodiments, the antibody of the present invention consists of or comprises a Fab, Fab', Fab'-SH, F(ab')2, Fv, a diabody, single-chain antibody fragment, or a multispecific antibody comprising multiple different antibody fragments. In some embodiments, the antibody of the present invention is not linked to a toxic moiety. In some embodiments, one or more amino acids selected from amino acid residues can be replaced with a different amino acid residue such that the antibody has altered C2q binding and/or reduced or abolished complement dependent cytotoxicity (CDC). This approach is described in further detail in U.S. Pat. Nos. 6,194,551.

In some embodiments, the antagonist is a polypeptide comprising a functional equivalent of a receptor subunit of the cytokine (i.e. IL-17 or IL-22). As used herein, a "functional equivalent of a receptor" is a polypeptide which is capable of binding to the cytokine, thereby preventing its interaction with it. The term "functional equivalent" includes fragments, mutants, and muteins of the receptor. Typically, the receptor is selected from the group consisting of IL17RA, IL17RC, IL22RA1 and IL22RA2 The term "functionally equivalent" thus includes any equivalent of the receptor obtained by altering the amino acid sequence, for example by one or more amino acid deletions, substitutions or additions such that the protein analogue retains the ability to bind to a the receptor. Amino acid substitutions may be made, for example, by point mutation of the DNA encoding the amino acid sequence. Functional equivalents include molecules that bind the cytokine and comprise all or a portion of the extracellular domains of the receptor so as to form a soluble receptor that is capable to trap the cytokine. Thus the functional equivalents include soluble forms of the receptor. A suitable soluble form of these proteins, or functional equivalents thereof, might comprise, for example, a truncated form of the protein from which the transmembrane domain has been removed by chemical, proteolytic or recombinant methods. Typically, the functional equivalent is at least 80% homologous to the corresponding protein. In some embodiments, the functional equivalent is at least 90% homologous as assessed by any conventional analysis algorithm. The term "a functionally equivalent fragment" as used herein also may mean any fragment or assembly of fragments of the receptor that binds to the cytokine. Accordingly the present invention provides a polypeptide capable of inhibiting binding of the receptor to the cytokine, which polypeptide comprises consecutive amino acids having a sequence which corresponds to the sequence of at least a portion of an extracellular domain of the receptor, which portion binds to the cytokine. In some embodiments, the polypeptide comprises an extracellular domain of the receptor.

In some embodiments, the polypeptide comprises a functional equivalent of the receptor which is fused to an immunoglobulin constant domain (Fc region) to form an immunoadhesin. Immunoadhesins can possess many of the valuable chemical and biological properties of human antibodies. Since immunoadhesins can be constructed from a human protein sequence with a desired specificity linked to an appropriate human immunoglobulin hinge and constant domain (Fc) sequence, the binding specificity of interest can be achieved using entirely human components. The immunoglobulin sequence typically, but not necessarily, is an immunoglobulin constant domain. The immunoglobulin moiety in the chimeras of the present invention may be obtained from IgG1, IgG2, IgG3 or IgG4 subtypes, IgA, IgE, IgD or IgM, but typically IgG1 or IgG3. In some embodiments, the functional equivalent of the PD-1 or THE CYTOKINE and the immunoglobulin sequence portion of the immunoadhesin are linked by a minimal linker. As used herein, the term "linker" refers to a sequence of at least one amino acid that links the polypeptide of the invention and the immunoglobulin sequence portion. Such a linker may be useful to prevent steric hindrances. In some embodiments, the linker has 4; 5; 6; 7; 8; 9; 10; 11; 12; 13; 14; 15; 16; 17; 18; 19; 20; 21; 22; 23; 24; 25; 26; 27; 28; 29; 30 amino acid residues. One useful group of linker sequences are linkers derived from the hinge region of heavy chain antibodies as described in WO 96/34103 and WO 94/04678. Other examples are poly-alanine linker sequences.

In some embodiments, the antagonist is an inhibitor of the expression of Th17 cytokine or one of its receptor. An "inhibitor of expression" refers to a natural or synthetic compound that has a biological effect to inhibit the expression of a gene. In a preferred embodiment of the invention, said inhibitor of gene expression is a siRNA, an antisense oligonucleotide or a ribozyme. For example, anti-sense oligonucleotides, including anti-sense RNA molecules and anti-sense DNA molecules, would act to directly block the translation of the cytokine or the receptor mRNA by binding thereto and thus preventing protein translation or increasing mRNA degradation, thus decreasing the level of the cytokine or the receptor, and thus activity, in a cell. For example, antisense oligonucleotides of at least about 15 bases and complementary to unique regions of the mRNA transcript sequence encoding the cytokine or the receptor can be synthesized, e.g., by conventional phosphodiester techniques. Methods for using antisense techniques for specifically inhibiting gene expression of genes whose sequence is known are well known in the art (e.g. see U.S. Pat. Nos. 6,566,135; 6,566,131; 6,365,354; 6,410,323; 6,107,091; 6,046,321; and 5,981,732). Small inhibitory RNAs (siRNAs) can also function as inhibitors of expression for use in the present invention. the cytokine or the receptor gene expression can be reduced by contacting a patient or cell with a small double stranded RNA (dsRNA), or a vector or construct causing the production of a small double stranded RNA, such that the cytokine or the receptor gene expression is specifically inhibited (i.e. RNA interference or RNAi). Antisense oligonucleotides, siRNAs, shRNAs and ribozymes of the invention may be delivered in vivo alone or in association with a vector. In its broadest sense, a "vector" is any vehicle capable of facilitating the transfer of the antisense oligonucleotide, siRNA, shRNA or ribozyme nucleic acid to the cells and typically cells expressing the cytokine or the receptor. Typically, the vector transports the nucleic acid to cells with reduced degradation relative to the extent of degradation that would result in the absence of the vector. In general, the vectors useful in the invention include, but are not limited to, plasmids, phagemids, viruses, other vehicles derived from viral or bacterial sources that have been manipulated by the insertion or incorporation of the antisense oligonucleotide, siRNA, shRNA or ribozyme nucleic acid sequences. Viral vectors are a preferred type of vector and include, but are not limited to nucleic acid sequences from the following viruses: retrovirus, such as moloney murine leukemia virus, harvey murine sarcoma virus, murine mammary tumor virus, and rous sarcoma virus; adenovirus, adeno-associated virus; SV40-type viruses; polyoma viruses; Epstein-Barr viruses; papilloma viruses; herpes virus; vaccinia virus; polio virus; and RNA virus such as a retrovirus. One can readily employ other vectors not named but known to the art. In some embodiments, the inhibitor of expression is an endonuclease. The term "endonuclease" refers to enzymes that cleave the phosphodiester bond within a polynucleotide chain. Some, such as Deoxyribonuclease I, cut DNA relatively nonspecifically (without regard to sequence), while many, typically called restriction endonucleases or restriction enzymes, and cleave only at very specific nucleotide sequences. The mechanism behind endonuclease-based genome inactivating generally requires a first step of DNA single or double strand break, which can then trigger two distinct cellular mechanisms for DNA repair, which can be exploited for DNA inactivating: the errorprone nonhomologous end-joining (NHEJ) and the high-fidelity homology-directed repair (HDR). In a particular embodiment, the endonuclease is CRISPR-cas. As used herein, the term "CRISPR-cas" has its general meaning in the art and refers to clustered regularly interspaced short palindromic repeats associated which are the segments of prokaryotic DNA containing short repetitions of base sequences. In some embodiment, the endonuclease is CRISPR-cas9 which is from *Streptococcus pyogenes*. The CRISPR/Cas9 system has been described in U.S. Pat. No. 8,697,359 B1 and US 2014/0068797. In some embodiment, the endonuclease is CRISPR-Cpf1 which is the more recently characterized CRISPR from Provotella and *Francisella* 1 (Cpf1) in Zetsche et al. ("Cpf1 is a Single RNA-guided Endonuclease of a Class 2 CRISPR-Cas System (2015); Cell; 163, 1-13).

As used herein, the term "effective amount" refers to an amount effective of the antagonist, at dosages and for periods of time necessary, to achieve a desired therapeutic result (i.e. treating aiway remodeling). A therapeutically effective amount of the antagonist may vary according to factors such as the disease state, age, sex, and weight of the individual, and the ability of the antagonist to elicit a desired response in the individual. A therapeutically effective amount is also one in which any toxic or detrimental effects of the antibody or antibody portion are outweighed by the therapeutically beneficial effects. The efficient dosages and dosage regimens for the antagonist depend on the disease or condition to be treated and may be determined by the persons skilled in the art. A physician having ordinary skill in the art may readily determine and prescribe the effective amount of the pharmaceutical composition required. For example, the physician could start doses of antagonist employed in the pharmaceutical composition at levels lower than that required achieving the desired therapeutic effect and gradually increasing the dosage until the desired effect is achieved. In general, a suitable dose of a composition of the present invention will be that amount of the compound, which is the lowest dose effective to produce a therapeutic effect according to a particular dosage regimen. Such an effective dose will generally depend upon the factors described above.

Typically the antagonist of the present invention is combined with pharmaceutically acceptable excipients, and optionally sustained-release matrices, such as biodegradable polymers, to form pharmaceutical compositions. The term "Pharmaceutically" or "pharmaceutically acceptable" refers to molecular entities and compositions that do not produce an adverse, allergic or other untoward reaction when administered to a mammal, especially a human, as appropriate. A pharmaceutically acceptable carrier or excipient refers to a non-toxic solid, semi-solid or liquid filler, diluent, encapsulating material or formulation auxiliary of any type. The carrier can also be a solvent or dispersion medium containing, for example, water, ethanol, polyol (for example, glycerol, propylene glycol, and liquid polyethylene glycol, and the like), suitable mixtures thereof, and vegetables oils. The proper fluidity can be maintained, for example, by the use of a coating, such as lecithin, by the maintenance of the required particle size in the case of dispersion and by the use of surfactants. The prevention of the action of microorganisms can be brought about by various antibacterial and antifungal agents, for example, parabens, chlorobutanol, phenol, sorbic acid, thimerosal, and the like. In many cases, it will be preferable to include isotonic agents, for example, sugars or sodium chloride. Prolonged absorption of the injectable compositions can be brought about by the use in the compositions of agents delaying absorption, for example, aluminium monostearate and gelatin. In the pharmaceutical compositions of the present invention, the active ingredients of the invention can be administered in a unit administration form, as a mixture with conventional pharmaceutical supports. Suitable unit administration forms comprise oral-route forms such as tablets, gel capsules, powders, granules and oral suspensions or solutions, sublingual and buccal administration forms, aerosols, implants, subcutaneous, transdermal, topical, intraperitoneal, intramuscular, intravenous, subdermal, transdermal, intrathecal and intranasal administration forms and rectal administration forms. In some embodiments, the pharmaceutical composition of the invention is administered topically (i.e. in the respiratory tract of the subject). Therefore, the compositions can be formulated in the form of a spray, aerosol, solution, emulsion, or other form well-known to one of skill in the art. If the method of the invention comprises intranasal administration of a composition, the composition can be formulated in an aerosol form, spray, mist or in the form of drops. In particular, the active ingredients for use according to the present invention can be conveniently delivered in the form of an aerosol spray presentation from pressurized packs or a nebuliser, with the use of a suitable propellant (e.g., dichlorodifluoromethane, trichlorofluoromethane, dichlorotetrafluoroethane, carbon dioxide or other suitable gas). In the case of a pressurized aerosol the dosage unit may be determined by providing a valve to deliver a metered amount. Capsules and cartridges (composed of, e.g., gelatin) for use in an inhaler or insufflator may be formulated containing a powder mix of the compound and a suitable powder base such as lactose or starch.

The invention will be further illustrated by the following figures and examples. However, these examples and figures should not be interpreted in any way as limiting the scope of the present invention.

FIGURES

FIG. 1. IgE humoral responses in dog-induced asthma co-sensitized or not with NOD2 agonist in WT mice versus IL-22 deficient mice.

Total IgE (A) and dog-specific IgE (B) levels in sera from mice sensitized or not with dog allergen and MDP and challenged with dog allergen in WT versus IL-22$^{-/-}$ C57BL6 mice in 4 independent experiments. Results are shown as mean±SEM of n=10-35 mice per group. ***p<0.001 versus PBS, § p<0.05, ##p<0.01.

Figure 2A:
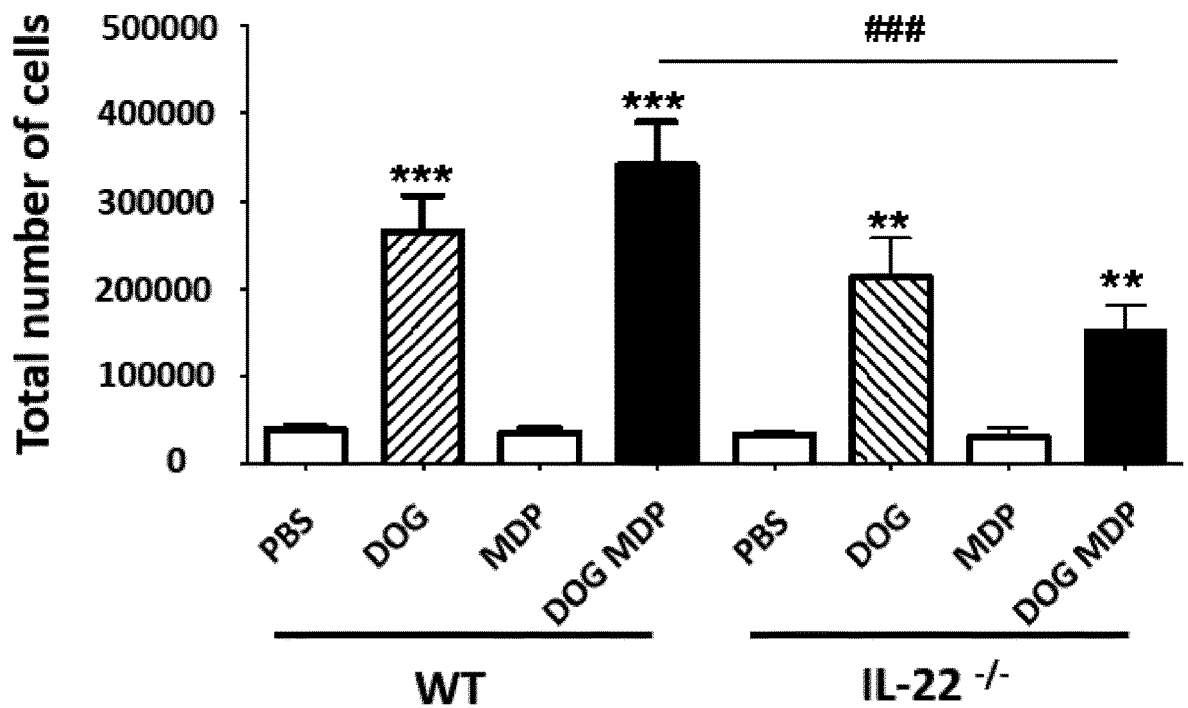
Figure 2B:
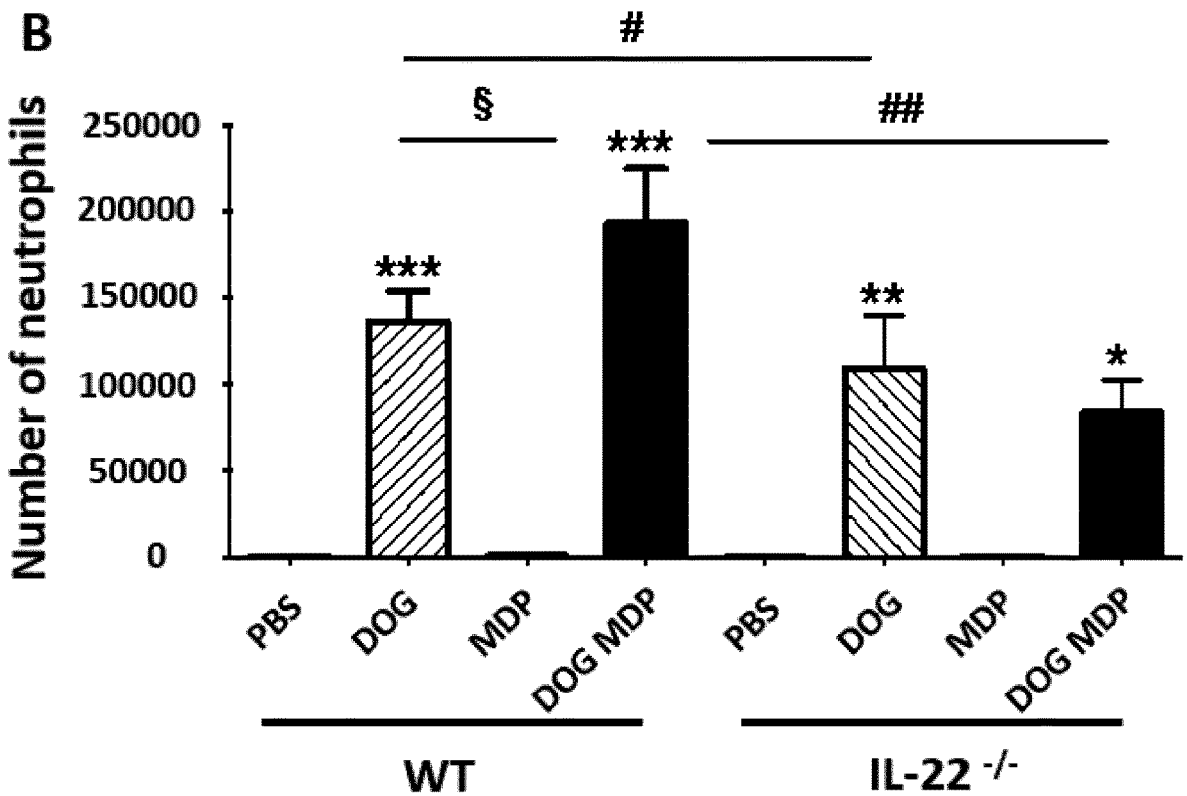
Figures 2C, 2D:
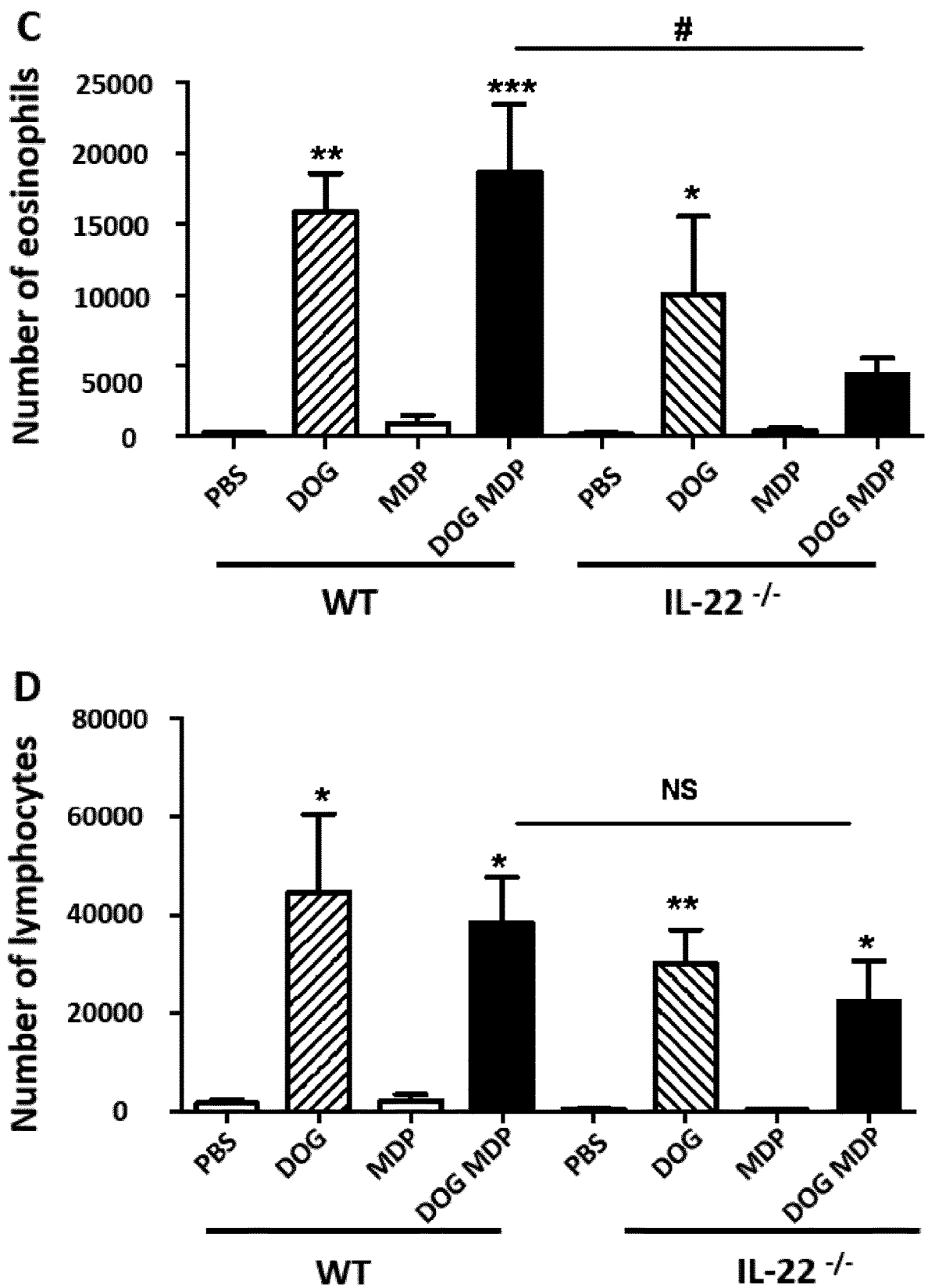

FIG. 2. BAL cell counts in dog-induced asthma co-sensitized or not with NOD2 agonist in WT mice versus IL-22 deficient mice.

(A-D) Broncho alveolar lavage cell counts in mice sensitized or not with dog allergen and MDP and challenged with dog allergen in WT versus IL-22$^{-/-}$ C57BL6 mice in 4 independent experiments. Results are shown as mean±SEM of n=10-35 mice per group. ***p<0.001 versus PBS, § p<0.05, ##p<0.01.

FIG. 3. Bronchial remodeling in dog-induced asthma in WT mice versus IL-22 deficient mice. (A) Area of peribronchial Collagen deposition assessed by Masson trichrome staining in WT versus IL-22 KO mice. Quantification was performed by image J software after exclusion of the vascular zones on a 20 µm deep zone below the bronchial basal membrane as µm2 collagen per µm length of bronchus. Results are normalized on the PBS group set at 1 and shown as mean value for 4 (MDP/Dog) to 10 (all other groups) bronchi from 2 to 3 different mice per group. (B) Bronchial mucus score was assessed by periodic acid Schiff staining and quantified using a quantitative visual score (0: no mucus 1: less than 50% positive cells 2: between 50 and 75% positive cells 4: More than 75% positive cells). Results are shown as mean of score of mucus per bronchus for 10-20 bronchi from 2 to 3 different mice per group. *p<0.01 p<0.01 versus PBS group (one way analysis of variance followed by Neuman-Kouls multiple comparison test). #p<0.02 WT versus KO mice.

FIG. 4. Airway hyperresponsiveness in dog-induced asthma co-sensitized or not with NOD2 agonist in WT mice (A) versus IL-22 deficient mice (B). (A-B) Airway resistances were measured using invasive plethysmography after increasing doses of metacholine. Results are shown as mean values±SEM for 9-11 mice per group from 3 to 4 different experiments. *p<0.001 p<0.01 *p<0.05 Dog versus PBS and ###p<0.001 #p<0.05 Dog/MDP versus PBS using two way analysis of variance.

EXAMPLE

Rationale:

Bronchial remodelling is a prominent feature of severe asthma and a potential therapeutic target. Some data indicate that IL-22 may be involved in remodelling processes in vitro, and in skin remodelling in vivo. The aim of this study was to evaluate if IL-22 was involved in bronchial remodelling in a severe model of allergic asthma, and if this was amplified by co-sensitization with NOD2 agonist, MDP (muramyl dipeptide), a ligand favouring Th17 polarization.

Methods:

A chronic model of dog allergen-induced asthma was developed over a 6 weeks period. Mice were or not co-sensitized with MDP and challenged with dog allergen alone. Parameters of bronchial remodeling and asthma were assessed in WT mice versus IL-22 deficient mice.

Figures 3A, 3B:
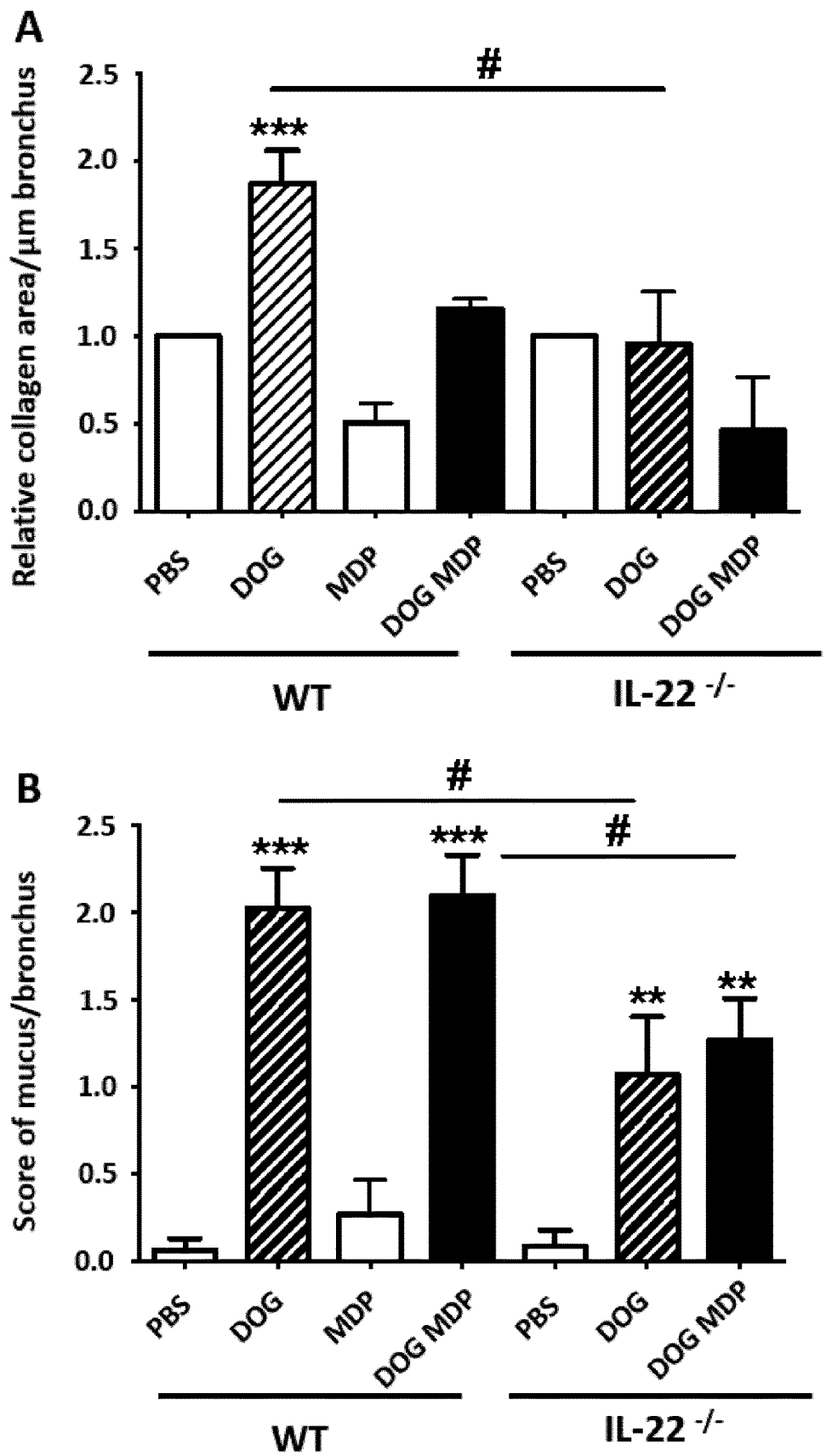
Figures 4A, 4B:
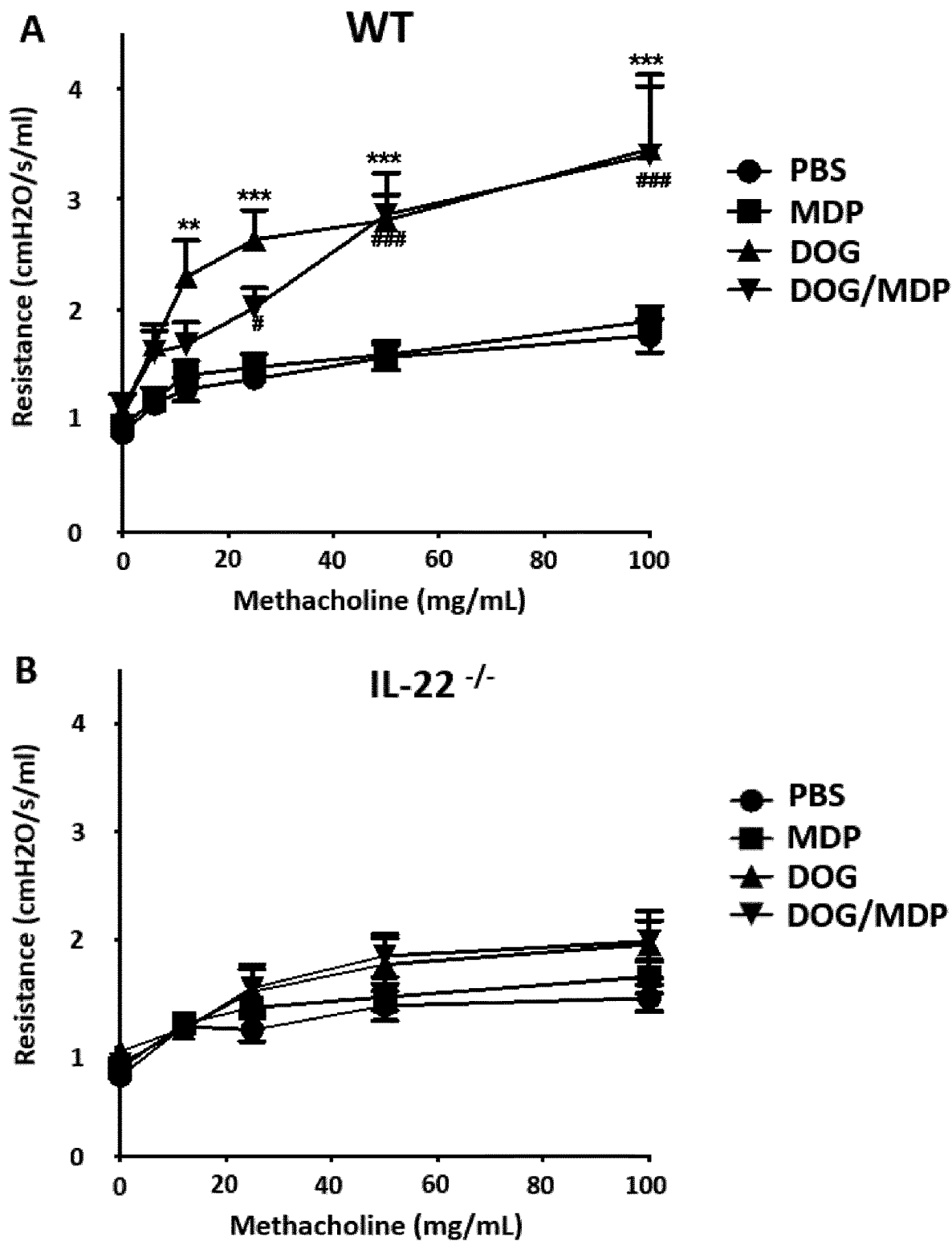

Results:

Dog allergen challenge led to a predominant neutrophilic infiltration in Broncho-alveolar lavage (BAL), increased dog-specific IgE production (FIGS. 1A and 1B), airways hyperresponsiveness, and increased Th17 cytokine production. NOD2 co-stimulated mice exhibited additional increases in BAL neutrophil counts and in dog-specific IgE production. Increased bronchial remodeling was observed in dog allergen challenged mice compared to PBS treated mice, with increased mucus production and peri bronchial collagen deposition. There was no additional bronchial remodeling when mice were cosensitized with MDP (FIGS. 3A and 3B). In IL-22 deficient mice, there was a decrease in BAL cell numbers including neutrophils and eosinophils, in dog-specific IgE, in particular in the MDP co-sensitized group (FIG. 2A-2D). IL-22 deficiency also decreased airway hyperresponsiveness, bronchial mucus production as well as peribronchial collagen deposition, in the allergen-challenged group (FIGS. 4A and 4B).

CONCLUSION

IL-22 participates in the bronchial remodeling in a chronic model of neutrophilic asthma, and may represent a therapeutic target in severe asthma.

REFERENCES

Throughout this application, various references describe the state of the art to which this invention pertains. The disclosures of these references are hereby incorporated by reference into the present disclosure.

The invention claimed is:

1. A method of treating bronchial remodeling in a patient suffering from allergic asthma comprising identifying the patient as having bronchial remodeling; and administering to the patient a therapeutically effective amount of an IL-22 antagonistic antibody.

2. The method of claim 1 wherein the patient suffers from severe asthma.

3. The method of claim 1 wherein the antagonistic antibody is fezakinumab.

4. The method of claim 1, wherein the therapeutically effective amount reduces the frequency, severity, or duration of an asthma exacerbation.

* * * * *